United States Patent [19]

Platts

[11] Patent Number: 5,094,882
[45] Date of Patent: Mar. 10, 1992

[54] ZINC OXIDE FILM GROWTH RATE ACCELERATOR

[75] Inventor: Dennis R. Platts, Livonia, Mich.

[73] Assignee: Ford Motor Company, Dearborn, Mich.

[21] Appl. No.: 626,515

[22] Filed: Dec. 12, 1990

[51] Int. Cl.$^5$ ............................................. B05D 5/06
[52] U.S. Cl. .................................. 427/168; 65/60.52; 427/110; 427/226; 427/314
[58] Field of Search ............... 427/110, 165, 166, 168, 427/169, 226, 314, 421; 65/60.52, 60.5

[56] References Cited

U.S. PATENT DOCUMENTS

| | | | |
|---|---|---|---|
| 3,850,665 | 11/1974 | Plumat et al. | 428/432 |
| 4,129,434 | 12/1978 | Plumat et al. | 65/60.52 |
| 4,160,061 | 7/1979 | Okino et al. | 65/60.52 |
| 4,239,816 | 12/1980 | Breininger et al. | 427/168 |
| 4,259,371 | 3/1981 | Postupack et al. | 427/314 |
| 4,292,347 | 9/1981 | Donley | 427/168 |
| 4,393,098 | 7/1983 | Stinson et al. | 427/168 |
| 4,397,671 | 8/1983 | Vong | 427/168 |

FOREIGN PATENT DOCUMENTS

| | | | |
|---|---|---|---|
| 752779 | 12/1970 | Belgium | 65/60.52 |
| 2160723 | 6/1973 | Fed. Rep. of Germany | 65/60.52 |
| 2360949 | 6/1974 | Fed. Rep. of Germany | 427/168 |
| 2909215 | 9/1979 | Fed. Rep. of Germany | 427/110 |
| 53-6651 | 3/1978 | Japan | 65/60.52 |
| 7209455 | 1/1973 | Netherlands | 427/168 |
| 2024189 | 1/1980 | United Kingdom | 427/168 |

OTHER PUBLICATIONS

Major, S. et al., "Highly Transparent and Conducting Indium-Doped Zinc Oxide Films by Spray Pyrolysis", Electronics and Optics, Thin Solid Films, 108 (1983) 333-340.

Aranovich, J. et al., "Optical and electrical properties of ZnO films prepared by spray pyrolysis for solar cell applications", J. Vac. Sci. Technol., 16(4), Jul./Aug. 1979, 994-1003.

Primary Examiner—Shrive Beck
Assistant Examiner—Terry J. Owens
Attorney, Agent, or Firm—Charles H. Ellerbrock; Roger L. May

[57] ABSTRACT

Cobaltous acetyl acetonate is added to a zinc acetate-containing reactant mixture, to accelerate the growth rate of a zinc oxide layer deposited on a glass substrate by the spray pyrolysis process.

12 Claims, No Drawings

ZINC OXIDE FILM GROWTH RATE ACCELERATOR

FIELD OF THE INVENTION

This invention relates generally to accelerating the growth rate of zinc oxide films deposited onto substrates. Specifically the growth rate of a zinc oxide layer deposited by spraying a solution of pyrolyzable zinc acetate onto a hot glass ribbon is accelerated by adding a quantity of cobaltous acetyl acetonate to the pyrolyzable solution.

BACKGROUND OF THE INVENTION

Zinc oxide is a well known component of coatings for automotive and architectural glazings. Such coatings are useful for providing enhanced performance characteristics, e.g., anti-reflectivity, electrical resistivity, infrared energy rejection, etc. A zinc oxide layer may conveniently be deposited onto a transparent substrate, either singularly or in combination with other metal and dielectric layers, by conventional methods such as, for example, spray pyrolysis, sputtering, vacuum evaporation, or chemical vapor deposition.

A zinc oxide layer which is particularly useful for preparing high performance automotive and architectural glazings is formed by the spray pyrolysis process, in which a reactant mixture containing a soluble zinc salt is sprayed onto a hot glass ribbon being produced by the float glass process. The zinc-containing compound pyrolyzes at the surface of the glass and, in the presence of oxygen, produces a layer of zinc oxide thereon. Several factors are important in determining the thickness and uniformity of the resultant zinc oxide layer. The temperature of the substrate must be high enough to effect the pyrolysis reaction, generally at least about 900° F. for the deposition of zinc oxide. The reactant mixture may be diluted with organic solvents or water for ease of control. However, the degree of dilution is limited by the need to attain a useful film deposition rate, and also by the chemistry of the pyrolysis reaction itself since the solubility limit must not be approached under the solution in-flight conditions. The spray pattern and velocity distribution of the droplets, as well as the turbulence and lateral vapor movement at the surface of the substrate, likewise affect the quality of the deposited layer. Given a particular zinc-containing pyrolytic precursor, the above enumerated process factors may be adjusted by routine experimentation to optimize the zinc oxide layer so produced.

A particularly useful and well-known zinc-containing pyrolytic precursor is zinc acetate. See, for example, Major et al., "Highly Transparent and Conducting Indium-Doped Zinc Oxide Films by Spray Pyrolysis," Thin Solid Films, 108 (1983) 333–340. Although other zinc-containing pyrolytic reactant mixtures yield higher deposition rates and therefore thicker zinc oxide layers under the identical process conditions, spray pyrolysis utilizing zinc acetate results in a higher quality film having a much more uniform appearance, higher optical transmittance, and greater electrical resistivity. Zinc oxide layers produced utilizing zinc acetate comprise columnar crystallites with average diameters of about one Angstrom and heights equal to the film thickness. The prior art does not suggest that spray solution adjuvants may be useful to accelerate the growth rate for zinc oxide layers deposited by a spray pyrolysis process utilizing zinc acetate as the zinc-containing pyrolysis reactant mixture precursor.

U.S. Pat. No. 3,850,665 to Plumat et al. discloses a process for forming a metal oxide coating on a substrate, wherein an acetyl acetonate coprecipitate of two or more metals such as, for example, zinc and cobalt is dissolved in a solvent and sprayed onto a hot glass ribbon. The resultant coating is a metal oxide containing zinc cobaltite ($ZnCo_2O_4$). The patent does not teach the addition of an acetyl acetonate to a zinc acetate-containing solution for spray pyrolysis, for increasing the growth rate of a zinc oxide layer.

U.S. Pat. No. 4,292,347 to Donley discloses a pyrolytic coating reactant for producing durable films, comprising a metal carboxylate such as, for example, zinc 2-ethyl hexonate and a diketonate such as, for example, cobaltous acetyl acetonate. The patent states that the combination of these pyrolytic coating reactants improves the durability of the produced coating, but does not substantially alter the reactivity of the coating composition nor the growth rate of the deposited layer.

It would be desirable to increase the growth rate of a zinc oxide layer deposited onto a hot glass ribbon utilizing a spray pyrolysis process, wherein zinc acetate is the zinc-containing pyrolytic precursor. Zinc oxide layers produced utilizing zinc acetate as the pyrolytic precursor have superior optical and physical properties, but suffer from lower growth rates than when other zinc-containing pyrolytic precursors are used.

SUMMARY OF THE INVENTION

Accordant with the present invention, a process for depositing a layer of zinc oxide onto a glass substrate, which process provides an accelerated zinc oxide growth rate, has surprisingly been discovered. The novel process may be practiced by first preparing a pyrolysis reactant mixture comprising zinc acetate, solvent, and a zinc oxide growth rate accelerating quantity of cobaltous acetyl acetonate. The glass substrate is then heated to a temperature sufficient to thermally decompose the reactant mixture. Finally, the reactant mixture is sprayed onto a surface of the glass sheet, to form a layer of zinc oxide on the surface thereof It has been determined that the addition of about 0.1% to about 10% by weight, preferably about 1% to about 4% by weight, of cobaltous acetyl acetonate is effective to increase the growth rate of a zinc oxide layer deposited by a spray pyrolysis process utilizing a zinc acetate-containing reactant mixture.

The process of the present invention is particularly suitable for preparing automotive or architectural glazings having one or more layers of zinc oxide incorporated into a high performance coating.

DETAILED DESCRIPTION OF THE PREFERRED EMBODIMENT

The growth rate of a zinc oxide layer deposited onto a hot glass ribbon by a spray pyrolysis process, wherein zinc acetate is utilized as the zinc-containing pyrolysis reactant, is accelerated by the addition of a quantity of cobaltous acetyl acetonate to the spray reactant mixture.

The glass upon which the zinc oxide layer is deposited may be in the form of individual glass sheets, or in the form of a continuous glass ribbon produced by the well-known float glass process. Suitable glass substrates for use according to the present invention may include any of the conventional glass compositions known in the art as useful for preparing automotive or architectural glazings. The various chemical compositions which produce different glass substrates, e.g., borosilicate glass or soda-lime-silica glass, generally do not structurally nor chemically affect the deposited layer of zinc oxide. A preferred glass is commonly known in the art as soda-lime-silica glass, and may be of any thickness generally known as useful for providing support for a layer of zinc oxide.

Where the glass to be coated with zinc oxide is being produced by the float glass process, the temperature of the glass is already sufficiently high to pyrolyze the coating reactants. Pyrolysis of the zinc acetate-containing reactant mixture generally is carried out at a temperature from about 900° F. to about 1,200° F., in the presence of an oxygen-containing atmosphere. Individual glass sheets which are to receive a coating of zinc oxide must be heated to approximately the specified temperature range to effect the pyrolysis reaction.

The reactant mixture according to the present invention comprises zinc acetate, a quantity of cobaltous acetyl acetonate, and a solvent. The cobaltous acetyl acetonate is present in an amount effective to accelerate the growth rate of the zinc oxide layer produced by spraying the reactant mixture against the hot surface of the glass. Zinc acetate pyrolyzes at the surface of the glass to form a layer of zinc oxide containing a small quantity of cobaltic oxide commensurate with the amount of cobaltous acetyl acetonate contained in the reactant mixture.

Zinc acetate is a well-known commercially available chemical reagent, generally produced by the reaction between acetic acid and zinc oxide.

Cobaltous acetyl acetonate conveniently may be prepared by dissolving cobaltous chloride in distilled water, and admixing in a stoichiometric proportion a solution of sodium acetate in acetyl acetone. Cobaltous acetyl acetonate precipitates as a metal chelate with the carbonyl oxygens of the organic portion of the molecule. Details concerning the preparation of acetyl acetonates are more fully set forth in Morgan and Moss, "Journal of the American Chemical Society," v. 105 (1914) 189-201.

Solvents useful for preparing the reactant mixture of the present invention include a wide variety of organic materials such as, for example, dimethylformamide, benzene, toluene, xylene, hexane, heptane, methanol, ethanol, methylene chloride, perchloroethylene, chloroform, carbon tetrachloride, dimethylacetamide, acetonitrile, nitrobenzene, acetic acid, ethylene diamine, and the like, as well as mixtures thereof. A preferred solvent is dimethylformamide.

The ingredients may be admixed in any conventional mixing device, and in any order. Generally, the solvent comprises from about 60% to about 95% by weight of the mixture. Preferrably, the solvent is from about 80% to about 90% by weight of the mixture. The cobaltous acetyl acetonate is present in an amount which will accelerate the growth rate of the zinc oxide layer formed when the reactant mixture is sprayed against a glass surface maintained at a pyrolyzing temperature. Generally, the cobaltous acetyl acetonate is from about 0.1% to about 10% by weight of the reactant mixture. Preferrably, the cobaltous acetyl acetonate comprises from about 1% to about 4% by weight of the reactant mixture.

The resultant zinc oxide layer may be deposited so as to form a layer having virtually any thickness, depending upon reaction time, spray conditions, glass temperature, etc. Generally, film thicknesses from about 50 Angstroms to about 5,000 Angstroms have been found to be useful for various automotive and architectural glazing applications, depending on the intended function of the zinc oxide coating.

Other reagents may optionally be added to the reactant mixture, to alter the properties of the resultant zinc oxide layer. For example, a small amount of a fluorine-containing compound may be added to the reactant mixture to increase the electrical conductivity or the infrared radiation reflectivity of the formed zinc oxide layer. Suitable fluorine-containing compounds according to the present invention are, for example, trifluoroacetic acid, 1,1-difluoroethane, trifluoroethanol, methyl trifluoroacetate, ammonium fluoride, and the like.

The inventive process is not only useful for forming a zinc oxide layer directly on a glass surface, but also for forming a zinc oxide layer on an already formed film which is strongly adherent to the glass surface. Thus, the present invention may be used to apply a zinc oxide layer over a previously applied dielectric or metal layer. Accordingly, the term "glass substrate" as used herein is intended to include glass having one or more of the aforementioned dielectric or metal layers. Examples of dielectric layers upon which a zinc oxide layer may be deposited according to the present invention include, but are not necessarily limited to, ZnO, $SnO_2$, $MgF_2$, $Al_2O_3$, TiN, $SiO_2$, MgO, $TiO_2$, and the like, as well as mixtures thereof. Contemplated metal layers having the same operability and utility upon which a zinc oxide layer may be deposited include, but are not necessarily limited to, Ag, Au, Cu, Ti, Al, Sn, etc., as well as alloys thereof. It is well known, for example, to manufacture a high performance automotive or architectural glazing having infrared rejection and/or electrical resistance heatability properties, comprising a glass substrate having multiple coatings of silver and zinc oxide thereon.

The process of the present invention is particularly useful when glass articles requiring a layer of zinc oxide must be manufactured in great numbers or at a high rate of speed. Because the growth rate is faster when cobaltous acetyl acetonate is added to the reactant solution than when zinc acetate is used alone, the pyrolysis reaction time required to make an equivalent thickness layer of zinc oxide is reduced. This, of course, reduces the processing time and cost required for manufacturing each coated glass article.

EXAMPLE

Cobaltous acetyl acetonate, zinc acetate, and dimethylformamide are admixed in the quantities specified in Table 1. A comparison solution containing no cobaltous acetyl acetonate is also prepared. The resulting solutions are sprayed onto clear soda-lime-silica glass sheets maintained at a temperature of about 935° F. The zinc oxide layer thicknesses, as determined by profilometry on steps etched into the layers with dilute hydrochloric acid, are set forth in Table 2 as a function of reaction time.

TABLE 1

| Pyrolysis Spray Solutions | | |
|---|---|---|
| Component | Example | Comparison |
| Zinc Acetate (wt. %) | 14.0 | 15.0 |
| Cobaltous Acetyl Acetonate (wt. %) | 1.4 | 0 |

TABLE 1-continued

| Pyrolysis Spray Solutions | | |
| --- | --- | --- |
| Component | Example | Comparison |
| Dimethylformamide (wt. %) | 84.6 | 85.0 |

TABLE 2

| Zinc Oxide Layer Thicknesses (Angstroms) | | |
| --- | --- | --- |
| Reaction Time | Example | Comparison |
| 13 seconds | 1,750 | 1,600 |
| 27 seconds | 3,300 | 3,150 |
| 39 seconds | 4,600 | 4,250 |
| 52 seconds | 5,550 | 4,950 |

It is observed that thicker zinc oxide layers are formed by the spray pyrolysis of a zinc acetate-containing reactant mixture additionally containing a quantity of cobaltous acetyl acetonate, than by the pyrolysis of a solution containing zinc acetate alone.

The preceeding example may be repeated with similar success by substituting the generically or specifically described reactants and/or reaction conditions recited herein for those actually used in the preceeding example.

From the foregoing description, one skilled in the art can easily ascertain the essential characteristics of this invention, and without departing from its spirit and scope, can make various changes and modifications in the invention to adapt it to various usages and conditions.

What is claimed is:

1. A process for depositing a layer of zinc oxide onto a glass substrate, comprising the steps of:
   A) preparing a pyrolysis reactant mixture, comprising:
      i) zinc acetate;
      ii) solvent; and
      iii) a zinc oxide growth rate accelerating quantity of cobaltous acetyl acetonate;
   B) heating the glass substrate to a temperature sufficient to thermally decompose the reactant mixture; and
   C) spraying the reactant mixture onto a surface of the glass substrate, to form a layer of zinc oxide on the surface thereof.

2. The process for depositing a layer of zinc oxide onto a glass substrate according to claim 1, wherein the solvent comprises from about 80% to about 90% by weight of the reactant mixture.

3. The process for depositing a layer of zinc oxide onto a glass substrate according to claim 1, wherein the cobaltous acetyl acetonate comprises from about 1% to about 4% by weight of the reactant mixture.

4. The process for depositing a layer of zinc oxide onto a glass substrate according to claim 1, wherein the glass substrate is heated to a temperature from about 900° F. to about 1,200° F.

5. The process for depositing a layer of zinc oxide onto a glass substrate according to claim 1, wherein the reactant mixture includes a fluorine-containing compound.

6. A process for depositing a layer of zinc oxide having a thickness from about 50 to about 5,000 Angstroms onto a glass substrate, comprising the steps of:
   A) preparing a pyrolysis reactant mixture, comprising:
      i) zinc acetate;
      ii) from about 80% to about 90% by weight of solvent;
      iii) from about 1% to about 4% by weight of cobaltous acetyl acetonate; and optionally
      iv) a fluorine-containing compound;
   B) heating the glass substrate to a temperature from about 900° F. to about 1,200° F.; and
   C) spraying the reactant mixture onto a surface of the glass substrate, to form a layer of zinc oxide on the surface thereof.

7. In a process for depositing a layer of zinc oxide onto a glass substrate, comprising spraying a zinc acetate-containing reactant mixture onto a surface of the glass substrate at a temperature sufficient to thermally decompose the reactant mixture, the improvement wherein a a zinc oxide growth rate accelerating quantity of cobaltous acetyl acetonate is added to the reactant mixture.

8. The process for depositing a layer of zinc oxide onto a glass substrate according to claim 7, wherein the cobaltous acetyl acetonate comprises from about 0.1% to about 10% by weight of the reactant mixture.

9. The process for depositing a layer of zinc oxide onto a glass substrate according to claim 7, wherein the cobaltous acetyl acetonate comprises from about 1% to about 4% by weight of the reactant mixture.

10. A process for accelerating the growth rate of a zinc oxide layer deposited onto a glass substrate by spray pyrolysis, wherein a zinc acetate-containing reactant mixture is sprayed onto a surface of the substrate maintained at a temperature sufficient to thermally decompose the reactant mixture and form a layer of zinc oxide thereon, comprising adding cobaltous acetyl acetonate to the reactant mixture.

11. The process for accelerating the growth rate of a zinc oxide layer deposited onto a glass substrate by spray pyrolysis according to claim 10, wherein the reactant mixture comprises from about 0.1% to about 10% by weight cobaltous acetyl acetonate.

12. The process for accelerating the growth rate of a zinc oxide layer deposited onto a glass substrate by spray pyrolysis according to claim 10, wherein the reactant mixture comprises from about 1% to about 4% by weight cobaltous acetyl acetonate.

* * * * *